United States Patent

Chevrier

[15] 3,663,739

[45] May 16, 1972

[54] UNIFORM FLAT CABLES

[72] Inventor: Jean-Claude Jacques Chevrier, Wilmington, Del.

[73] Assignee: E. I. du Pont de Nemours and Company, Wilmington, Del.

[22] Filed: Oct. 26, 1970

[21] Appl. No.: 83,728

[52] U.S. Cl. ................................174/36, 174/32, 174/117 F

[51] Int. Cl. ........................................................H01b 11/06

[58] Field of Search..........174/32, 36, 117 R, 117 F, 117 FF, 174/113 R

[56] References Cited

UNITED STATES PATENTS

| | | | |
|---|---|---|---|
| 286,698 | 10/1883 | Henley | 174/117 |
| 2,932,687 | 4/1960 | Cook | 174/117 |
| 3,469,016 | 9/1969 | Shelton | 174/117 FF X |

*Primary Examiner*—E. A. Goldberg
*Attorney*—Gary L. Griswold

[57] ABSTRACT

Flat cables comprising a layer containing polymeric material, polymeric material-containing ribs spaced along the width running substantially the length of the layer of polymeric material forming grooves on the layer of polymeric material, the grooves containing metal conductor, and a covering layer containing metal conductor.

7 Claims, 10 Drawing Figures

Patented May 16, 1972 3,663,739

2 Sheets-Sheet 1

INVENTOR

JEAN-CLAUDE CHEVRIER

BY [signature]

AGENT

INVENTOR
JEAN-CLAUDE CHEVRIER

BY [signature]

AGENT

UNIFORM FLAT CABLES

This invention relates to flat cables. Particularly, this invention relates to flat cables which utilize polymeric material which is in the form of a uniplanar layer with ribs attached to one of its surfaces.

It was known that uniplanar layers with ribs extending from one of the layer's surfaces could be formed from polymeric material (U.S. Pat. No. 3,439,798). Attaching a layer of metal to the surface of the layer of polymeric material on the surface of the layer of polymeric material opposite to that attached to the ribs was also known.

Flat cables, i.e., cables which contain more than one transmitting conductor within the cable are known in the art. One problem which arises when one attempts to put more than one transmitting conductor near to another transmitting conductor if the transmitting conductors are not shielded properly is cross talk. Cross talk is present when two conductors which are carrying alternating current have their electromagnetic fields cross such that a signal in one conductor induces another undesirable signal in the other conductor. Other problems are that (1) flat cables are usually used with connectors, therefore requiring that the conductors be spaced uniformly from one cable to the next, and (2) the center-to-center distance of the conductors must be uniform to maintain constant impedance and, hence, good impedance matching. Previously used flat cables attempted to minimize the above-mentioned cross talk by utilizing grounded conductors between transmitting conductors or ground conductors on the outer surface of the flat cable (U.S. Pat. No. 3,179,904).

Flat cable constructions have now been found which solve the problems heretofore typical in flat cables. The newly found flat cable utilizes the aforementioned polymeric material ribbed structure, thus allowing for uniformity, and through its various structures allows the transmitting conductors to be shielded by layers of metal conductors. Such a flat cable comprises a first layer containing polymeric material, said layer having polymeric material-containing ribs spaced along the width of one of its surfaces running the length of said surface forming grooves on said surface, said grooves containing metal conductor extending substantially the length of said grooves, and a layer containing metal conductor covering said polymeric material-containing ribs on the ends of said ribs opposite to those contacting said first layer containing polymeric material. Some of the various embodiments of the above-described structure will be depicted later.

The various embodiments of the invention are shown in the accompanying drawings in which.

Figure 1:
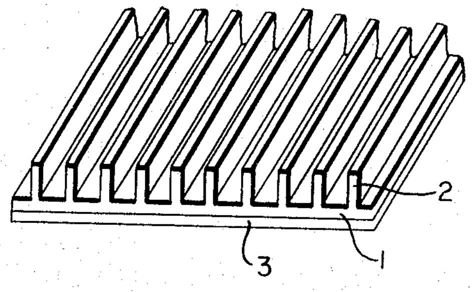
FIG. 1 is a perspective of the uniplanar layer of polymeric material with ribs attached covered with a layer of metal conductor.

Now referring to the drawings more specifically, FIG. 1 depicts the basic polymeric material uniplanar film 1 with the polymeric material ribs 2 attached to one surface and covered with a layer of metal conductor 3 on the opposite surface. This structure is used directly in making the flat cables of FIGS. 4, 5 and 6. This structure without the layer of metal conductor is used in making the flat cables of FIGS. 2 and 3.

Figure 2:
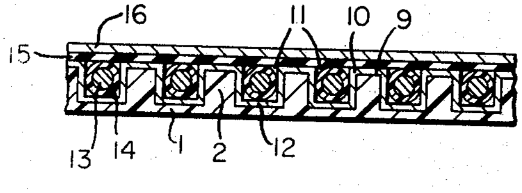
FIG. 2 is a partial cross section of a flat cable employing the ribbed structure of FIG. 1 without the metal conductor coating in which the grooves contain a layer of metal conductor plus polymeric material-coated metal conductors and in which the grooves are covered with a layer of polymeric material which is covered with a layer of metal conductor.

The flat cable embodiment depicted by FIG. 2 which utilizes the structure of FIG. 1 without the layer of metal conductor comprises a first layer of polymer material 1, the first layer having polymeric material-containing ribs 9, i.e., ribs that are polymeric material 2 covered with a layer of metal conductor 10 covering the polymeric material spaced along the width of one of its surfaces forming grooves 11 on the surface, the grooves 11 containing metal conductor, i.e., the bottom of the grooves have a layer of metal conductor 12 covering them and the grooves contain a second metal conductor 13 with a polymeric material layer 14 contacting and encircling the second metal conductor 13, the polymeric material encircled second metal conductors 13 running substantially the length of the grooves 11 and a layer containing metal conductor covering the polymeric material-containing ribs 9 on the ends of the ribs opposite to those contacting the first layer of polymeric material 1, the layer containing metal conductor being a second layer of polymeric material 15 covering the polymeric material-containing ribs 9 at the ends of the polymeric material-containing ribs opposite to those contacting the first layer of polymeric material 1, the second layer of polymeric material 15 being covered with a layer of metal conductor 16 on its surface which is opposite to that contacting said polymeric material containing ribs 9. In this embodiment, the shielding of the transmitting conductors 13 from cross talk is accomplished by the metal layer in the grooves 12, the metal conductor-covered ribs 9 and the metal conductor layer 16.

Figure 3:
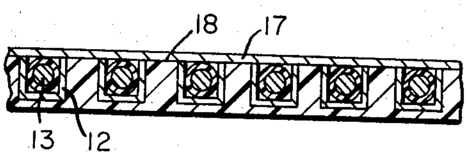
FIG. 3 is a partial cross section of a flat cable like that in FIG. 2 except that the layer of polymeric material between the ribs and outside layer of metal conductor is not present.

FIG. 3 depicts another embodiment of the flat cable. Its structure is the same as that in FIG. 2 except that the layer containing metal conductor is entirely metal conductor 17 and doesn't include the second layer of polymeric material 15 of FIG. 2. The shielding of the transmitting conductors 13 is accomplished as is described for FIG. 2 by the layer of metal conductor 12 in the grooves, the metal conductor-covered ribs 18 which are covered only on their sides, and the layer of metal conductor 17.

Figure 4:
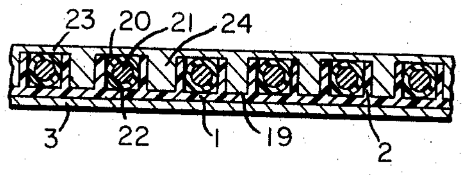
FIG. 4 is a partial cross section of a flat cable which utilizes ground conductors alternating in the grooves to shield the transmitting metal conductors which are each covered with a polymeric material layer.

The flat cable embodiment of FIG. 4 utilizes the structure of FIG. 1 in that the first layer containing polymeric material is a layer of polymeric material 1 with a layer of metal conductor 3 covering the surface of the layer of polymeric material 1 opposite to the surface of the polymeric material contacting the polymeric material-containing ribs 2 which, in this case, are entirely polymeric material and aren't metal conductor-covered. The grooves containing metal conductor alternate between those 19 which have only metal conductor running the length of the grooves and those 20 which have a metal conductor 21 with a polymeric material layer 22 contacting and encircling the metal conductor running substantially the length of the grooves. The layer containing metal conductor is entirely metal conductor 23. The transmitting metal conductors 21 are shielded in this embodiment by the two metal conductor layers 23 and 3 and the alternating grooves containing ground metal conductors 24.

Figure 5:
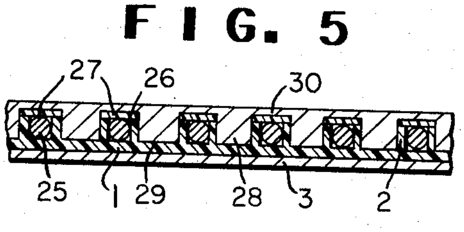
FIG. 5 is a partial cross section of a flat cable which like the cable of FIG. 4 uses alternating ground conductors to shield the transmitting metal conductors but instead of the transmitting metal conductors being covered with a layer of polymeric material, the grooves containing them are covered with the polymeric material.

In the flat cable embodiment shown in FIG. 5, the structure of FIG. 1 is also utilized. However, in FIG. 5, the transmitting metal conductors 25 running substantially the length of the grooves 26 are not polymeric material-covered. Instead the groove 26 in which they are placed is covered with a layer of polymeric material 27 which covers all ribs but only alternating grooves. The ground metal conductors 28 are in the grooves 29 alternating with those 26 containing the transmitting metal conductors 25. The layer containing metal conductor is the layer of metal conductor 30 and polymeric material layers 27 covering all the ribs 2 but only alternating grooves. Shielding of the transmitting metal conductors 25 is accomplished by the two metal conductor layers 30 and 3 and the alternating ground metal conductors 28 running substantially the length of grooves 29.

Figure 6:
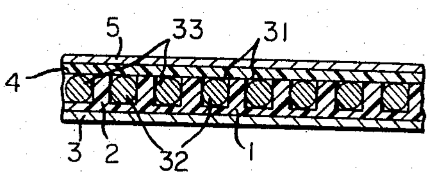
FIG. 6 is a partial cross section of a flat cable which utilizes alternating shield and transmitting metal conductors and is covered on both its upper and lower surfaces with a layer of metal conductor.

FIG. 6 depicts an embodiment of the flat cable which utilizes the structure of FIG. 1, i.e., metal layer 3, polymeric material layer 1, and polymeric material ribs 2. In this embodiment, the grooves 31 formed by the ribs 2 alternate in containing transmitting metal conductor 32 running substantially the length of the grooves and ground metal conductors 33 running substantially the length of the grooves. The layer containing metal conductor is a layer of polymeric material 4 covered by a layer of metal conductor 5 on its surface opposite to that contacting the polymeric material ribs 2. The shielding of the transmitting metal conductors 32 is accomplished by the alternating ground conductors 33 and the two layers of metal conductors 3 and 5.

In the above presented flat coaxial cable structures, the shape of the metal conductors can vary from round, circular, square, rectangular, etc. The ribs can be equidistantly spaced or can vary in spacing if such is desired for the particular application, although such variation will be programmed and not accidental. The number of ground conductors between transmitting conductors can vary with the particular use for which the cables are to be utilized. The conductors in the cables are held securely in place by the structure of the cables.

Figure 7:
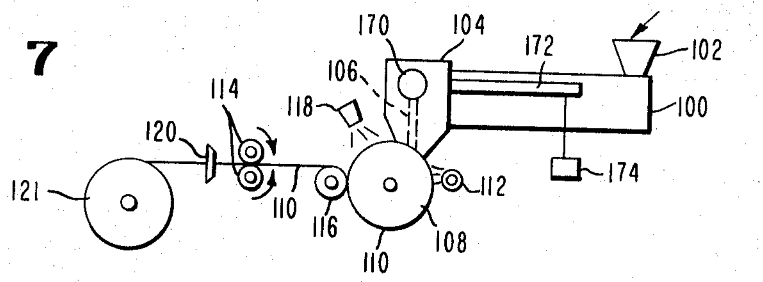
FIG. 7 is a diagrammatic side elevation of an apparatus for making a uniplanar layer of polymeric material with attached ribs for use in the present invention.

A preferred method and apparatus for making the uniplanar layer of polymeric material with ribs attached of FIG. 1 is described hereinafter with reference to FIGS. 7 to 10. In FIG. 7 is shown an extruder 100 equipped with a hopper 102 for receiving thermoplastic resin and melting it under pressure. A die 104 receives the pressurized molten resin through its rear (hidden) side from the extruder and passes the resin along a path 106 which terminates in an outlet in pressure-seal relation with a rotating patterned roll 108 and directs the resin substantially free of pressure drop and in the absence of air into the pattern of the roll. The roll 108 continuously moves the molten resin away from the outlet of path 106, thereby forming a continuous molded web 110 having a pattern which is complementary to that of the roll. The web 110 is chilled by a flume or water spray 112, and after sufficient contact with the roll 108 which is internally cooled, the cooled web is removed from the roll by take-off rolls 114 aided by a stripper roll 116 and, optionally, mold release agent applied by spray nozzles 118 to the surface of the roll prior to passage under die 104. Longitudinal dividing or trimming of web 110 is accomplished, if desired, by one or more blades 120 positioned between the take-off rolls 114 and one or more reels 121 (only one shown).

Figure 8:
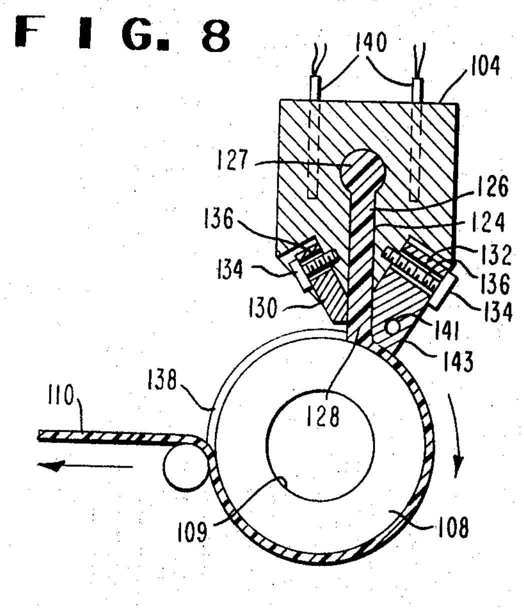
FIG. 8 is a cross section of one embodiment of molding apparatus for use in the apparatus of FIG. 7.

To further describe the die 104 and patterned roll 108, which comprise the molding apparatus, FIG. 8 shows one embodiment in which die 104 contains a cavity 124 serving as path 106 (FIG. 7) and which is supplied with molten thermoplastic resin 126 through inlet pipe 127 by extruder 100. Die 104 is heated to a temperature above the resin melting temperature of the particular resin being used, by electrical heating elements 140 extending into corresponding wells in the die. The resin melting temperature is the minimum temperature at which a fresh sample of resin leaves a molten train as it is moved slowly across a heated metal surface. This is also sometimes called the stick temperature. Cavity 124 terminates in a slot-shaped outlet 128 extending across the surface of roll 108. The rearward and forward edges of outlet 128 are defined by a die plate 130 and a doctor blade 132, each adjustably spaced from roll 108 and secured to die 104 by bolts 134 extending through slots 136. The pressure upon the molten resin 126 in the cavity forces the resin through outlet 128 and into the roll pattern represented by circumferential grooves 138 (only one shown). The cavity 124 and outlet 128 are substantially free of constriction so that the pressure on the resin at the surface of roll 108 is substantially the same as the pressure on the resin in cavity 124.

The grooves 138 mold the ribs extending from one surface of the web 110. The opposite surface of the web is formed by doctor blade 132 which is adjustably spaced from roll 108 to give the web thickness desired. The web 110 is thus in the form of a uniplanar layer with attached ribs such as shown in FIG. 1, with the longitudinal dividing by blades 120 giving the width desired.

In further detail doctor blade 132 is heated by an electrical heating element 141 usually to a temperature which is equal to or greater than the temperature maintained by die 104. The outer face 143 of the doctor blade departs sharply from the path of web 110 so as to avoid sticking of the web to the hot doctor blade. Roll 108 is cooled to a temperature which is at least about 10° C. less than the melting temperature of the resin being molded, such as by passing a cooling medium through an interior passage 109.

Figure 9:
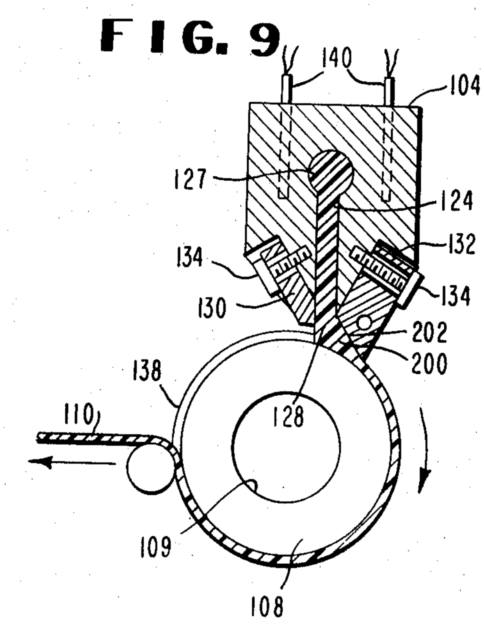
FIG. 9 is a cross section of another embodiment of apparatus for use in the apparatus of FIG. 7.

In FIG. 9 essentially the same equipment arrangement as in FIG. 8 is used except that slot-shaped outlet 128 includes a wedge-shaped passage 200 extending in the direction of rotation of roll 108. The wedge shape of the passage 200 is formed by doctor blade 132 having a slant surface 202 facing the roll 108. Movement of the surface of roll 108 past the opening 128 drags molten resin into the passage 200 wherein the flowing resin is forced into the pattern of roll 108. This drag flow pressure created in the passage 200 at the surface of the roll augments the pressure on the resin within cavity 124 of the die.

The wedge-shaped passage 200 can be of any configuration which augments the molding pressure supplied by the extruder. Generally, the passage 200 will take the form of converging surfaces, with the roll pattern forming one of these surfaces. The pressures required on molten thermoplastic resin in cavity 124 can be less than the full extrusion pressure of the extruder, depending upon which resin is employed and upon operating conditions. The pressure in the cavity 124, however, is substantially the same as the pressure on the resin coming into contact with the pattern of the roll surface. When such pressure is insufficient, the drag flow arrangement of FIG. 9 can be used to increase the force present for continuously filling the pattern with molten resin.

The molding apparatus of FIGS. 8 and 9 can be provided with water spray 112 and mold release spray nozzles 118 as shown in FIG. 7.

A pressure-seal relation between the outlet 128 for the molten thermoplastic resin and roll 108 is maintained so that the pressure on the resin in cavity 124 and the drag flow pressure, when the apparatus of FIG. 9 is employed, are available to force the resin into the pattern of roll 108 on a continuous and high speed of production basis. The pressure-seal relation is obtained, in part, by adjusting the doctor blade 132 to constrict the flow space for the resin as it leaves outlet 128 and by having a sufficient rate of web formation for the viscosity of the particular resin being molded to prevent back flow under the die plate 130 which is generally spaced 2 to 10 mils from the surface of roll 108.

Figure 10:
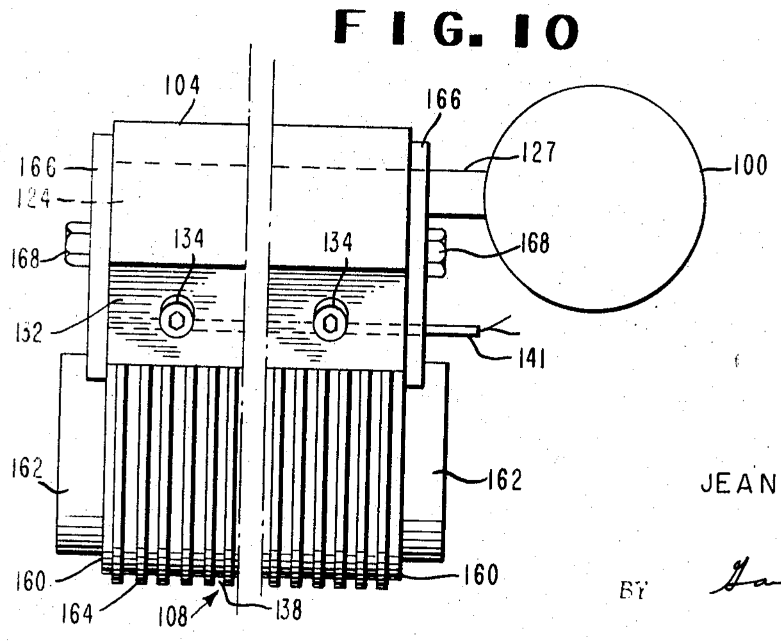
FIG. 10 is an embodiment for laterally confining molten thermoplastic resin in an embodiment of roll pattern for making a uniplanar layer of polymeric material with attached ribs useful in the present invention.

FIG. 10 shows, in indeterminate width, means for laterally confining the molten thermoplastic resin as it leaves opening 128 so as to complete the pressure-seal relation. In FIG. 10, the doctor blade 132 is shown in operative position and provided with heating element 141. The lateral surface of the roll 108 is provided with a pattern, shown in enlargement, of circumferential grooves 138 terminating at shoulders 160 formed between the surface of the roll and cylindrical ends 162 of reduced diameter extending from each end of the roll.

The molten resin from cavity 124 is molded into a web which extends entirely across the roll pattern. Further sideways flow of the resin, however, is prevented by a pair of end plates 166 adjustably spaced from roll 108 by bolts 168 passing through slots (not shown) in the end plates and tightened into die 104. The end plates 166 each lie close to the shoulders 160 and have a lower arcuate surface lying close to the corresponding surface of cylindrical ends 162. This close spacing, on the order of several mils, permits a small amount of molten resin to enter the tortuous path around shoulders 160 before chilling of the resin occurs. This chilling prevents sideways leakage of additional resin and loss of molding pressure. A low friction pressure sealing system, without the need for metal-to-metal contact or necessity for further lubrication, is provided by this small amount of resin entering between end plates 166 and roll 108. The end plates 166 also form the lateral sides for cavity 124 and the die outlet 128 which is coextensive therewith.

Means can also be provided for changing the spacing between the die 104 and the roll 108 to compensate for pressure fluctuations caused by extruder 100 so as to maintain a constant force on the resin entering the roll pattern. Exemplary of such means is the pivotal mounting of die 104 about a stub shaft 170 which is on center with the feed line between extruder 100 and the die, and providing a lever arm 172 having the desired weight 74 suspended therefrom as shown in FIG. 7. Excessive molding pressure is relieved by the die 104 rotating away from roll 108. Upon return of the pressure to normal, weight 174 restores the die 104 to its former position to produce web of the desired thickness.

The above description of the method and process for making the structures of FIG. 1 did not include the addition of the metal conductor as shown in FIG. 1. The process and apparatus can be modified to include such addition or it can be added in a separate operation. The outer metal conductor layers which may be but are not required to be continuous may be attached to the polymeric material structure by laminating metal foil to the structure by heating or by coating the polymeric material before applying the metal foil. Other methods include electrocoating and vacuum or chemical vapor sputtering. These methods may also be utilized for placing metal conductor in the grooves and covering the ribs with metal conductor. The methods used depend on the metal conductor and polymeric material utilized.

THe dielectric polymeric materials which are useful in making ribbed structure for use in the present invention are generally those which can be formed into the ribbed structure shape by such processes as extruding, molding or casting. For electrical character, the polymeric material should have a dielectric constant of less than 10 and preferably less than 5.5, and a dissipation factor (energy loss) of no greater than 0.01 and preferably no greater than 0.001.

Suitable polymeric materials include natural and synthetic rubbers such as polyurethanes, polychloroprenes, EPT sulfur-curable elastomers such as described in U. S. Pat. No. 2,933,480 to Gresham and Hunt, and copolymers of hexafluoropropylene with vinylidene fluoride and optionally tetrafluoroethylene; and thermoplastic resins, including ABS resin, the saturated hydrocarbon polymers, such as polyethylene, linear or branched, polypropylene and copolymers thereof; ionomers such as described in Canadian Pat. Nos. 674,595 and 713,631, both to R. W. Rees; copolymers of ethylene with an $\alpha,\beta$-unsaturated carboxylic acid such as described in British Pat. No. 963,380 to Du Pont, and blends thereof with saturated hydrocarbon polymers, optionally containing co-crystallized water-activated oxide cross-linking agents; halogenated or perhalogenated olefin polymers, such as polymers of vinyl chloride, vinylidene chloride, chlorotrifluoroethylene, vinyl fluoride and vinylidene fluoride and melt fabricable tetrafluoroethylene polymers with comonomers such as hexafluoropropylene, perfluoroalkyl vinyl ether, e.g., perfluoropropyl vinyl ether, or the monomer described and claimed in U. S. Pat. No. 3,308,107 to Selman and Squire; polyvinyl acetate and blends thereof with saturated hydrocarbon polymers and optionally, the acid copolymers of British Pat. No. 963,380 to Du Pont; polymers of $\alpha,\beta$-unsaturated carboxylic acid esters, such as polymethylmethacrylate; the polyamides such as polyhexamethylene adipamide (66 nylon), polyhexamethylene sebacamide (610 nylon), polycaprolactam (6 nylon), copolymers, and blends with ionomers and/or saturated hydrocarbon polymers; polyoxymethylene polymer and copolymer; polycarbonate, polysulfone, and polyethylene terephthalate. These polymeric materials can contain any of the various additives used to modify the resin, such as antioxidants, fillers, reinforcing agents, such as fiber glass, hydrolytic and thermal stabilizers and colorants so long as the electrical requirements herein set forth are met.

The flat cables depicted are useful in computer-type applications where small, uniform, shielded conductors are required.

The above description is a description of preferred embodiments. Many variations and modifications within the spirit of the invention will appear to those skilled in the art and such are considered to fall within the scope of the following claims.

I claim:

1. A flat cable which comprises a. a first layer containing polymeric material, b. polymeric material-containing ribs spaced along the width of one of the surfaces of said first layer (a) running the length of said surface, c. grooves on said surface formed by said ribs, said grooves containing metal conductor extending substantially the length of said grooves, and d. a layer containing metal conductor covering said polymeric material-containing ribs on the ends of said ribs opposite to those contacting said first layer containing polymeric material.

2. The flat cable of claim 1 in which said polymeric material-containing ribs (b) are equidistantly spaced along the width of said surface of said first layer (a) containing polymeric material.

3. The flat cable of claim 1 in which said first layer (a) containing polymeric material is entirely polymeric material and in which said polymeric material-containing ribs (b) are polymeric material ribs covered on their tops and sides with a layer of metal conductor which also covers the bottoms of grooves (c), said grooves (c) also containing metal conductor having a polymeric material layer contacting and encircling said metal conductor, said polymeric material encircled metal conductors running substantially the length of said grooves, and in which said layer (d) containing metal conductor is made up of a second layer of polymeric material covering said polymeric material-containing ribs (b) at the ends of said ribs opposite to those contacting said first layer (a) of polymeric material, said second layer of polymeric material being covered with a layer of metal conductor on its surface which is opposite to that contacting said polymeric material-containing ribs (b).

4. The flat cable of claim 1 in which said first layer (a) containing polymeric material is entirely polymeric material, in which said polymeric material-containing ribs (b) are polymeric material ribs covered on their sides with a layer of metal conductor which also covers the bottoms of grooves (c), said grooves (c) also containing metal conductor having a polymeric material layer contacting and encircling said metal conductor, said polymeric material-encircled metal conductors running substantially the length of said grooves, and in which said layer (d) containing metal conductor is a layer of metal conductor covering said polymeric material-containing ribs (b) at the ends of said ribs (b) opposite to those contacting said first layer (a) containing polymeric material.

5. The flat cable of claim 1 in which said first layer (a) containing a polymeric material is a layer of polymeric material with a layer of metal conductor covering the surface of said layer of polymeric material opposite to the surface of said layer of polymeric material contacting said polymeric material-containing ribs (b), in which said polymeric material-containing ribs (b) are polymeric material, in which said grooves (c) containing metal conductor contain metal conductor running substantially the length of said grooves, and in which the layer (d) containing metal conductor is made up of a second layer of polymeric material covering said polymeric material-containing ribs (b) at the ends of said ribs (b) opposite to those contacting said first layer of polymeric material, said second layer of polymeric material being covered with a layer of metal conductor on its surface which is opposite to that contacting said polymeric material-containing ribs (b).

6. A flat cable which comprises a. a first layer of polymeric material having a layer of metal conductor covering one surface, b. ribs of polymeric material spaced along the width of the opposite surface of said first layer (a) running the length of said surface, c. grooves on said surface formed by said ribs, said grooves having, alternately, (1) only metal conductor running substantially the length of said grooves, and (2) metal conductor with a polymeric material layer contacting and encircling said metal conductor running substantially the length of said grooves, and d. a layer of metal conductor covering said ribs on the ends of said ribs opposite to those contacting said first layer (a) of polymeric material.

7. A flat cable which comprises a. a first layer of polymeric material having a layer of metal conductor covering one surface, b. ribs of polymeric material spaced along the width of the opposite surface of said first layer (a) running the length of said surface, c. grooves on said surface formed by said ribs, said grooves containing metal conductor running substantially the length of said grooves, and d. a layer containing metal conductor covering said ribs on the ends of said ribs opposite to those contacting said first layer (a) of polymeric material such that said layer containing metal conductor has a layer of polymeric material covering alternating grooves and a layer of metal conductor covering the alternating layers of polymeric material plus the rest of the grooves.

* * * * *